(12) United States Patent
Hofmann

(10) Patent No.: US 7,374,672 B2
(45) Date of Patent: May 20, 2008

(54) FILTER DEVICE COMPRISING INTEGRAL CENTRIFUGAL SEPARATION

(75) Inventor: Wilfried Hofmann, Munich (DE)

(73) Assignee: NFT Nanofiltertechnik GmbH, Bad Homburg V.D.H. (DE)

( * ) Notice: Subject to any disclaimer, the term of this patent is extended or adjusted under 35 U.S.C. 154(b) by 476 days.

(21) Appl. No.: 10/512,151

(22) PCT Filed: Apr. 22, 2003

(86) PCT No.: PCT/EP03/04165

§ 371 (c)(1),
(2), (4) Date: Mar. 30, 2005

(87) PCT Pub. No.: WO03/089111

PCT Pub. Date: Oct. 30, 2003

(65) Prior Publication Data

US 2005/0178712 A1    Aug. 18, 2005

(30) Foreign Application Priority Data

Apr. 22, 2002    (DE)    ............... 102 17 967

(51) Int. Cl.
   *C02F 9/00*    (2006.01)
(52) U.S. Cl. .................. 210/195.3; 210/304; 210/310; 210/307; 210/195.4; 210/197

(58) Field of Classification Search ........... 210/321.75, 210/195.3, 195.4, 196, 197, 307, 310, 304
See application file for complete search history.

(56) References Cited

U.S. PATENT DOCUMENTS

| 4,368,118 A | 1/1983 | Siposs |
| 5,183,569 A | 2/1993 | Kyriacou |
| 5,352,256 A | 10/1994 | Stead et al. |
| 5,500,134 A * | 3/1996 | Chahine ..................... 210/787 |

FOREIGN PATENT DOCUMENTS

| DE | 7225662 U1 | 11/1972 |
| FR | 1433427 A | 4/1966 |

\* cited by examiner

*Primary Examiner*—Krishnan Menon
*Assistant Examiner*—Benjamin Kurtz
(74) *Attorney, Agent, or Firm*—Senniger Powers LLP

(57) ABSTRACT

A filter apparatus having a filter membrane, a main body, a supply channel running perpendicular to the surface of the filter membrane and a gap running between it and the filter membrane, for the formation of a tangentially directed transverse flow, a return channel connected with the supply channel, a circulation channel located around a circumferential edge of the membrane, having an inlet connected to the gap and an outlet connected to the return channel, and a circulator to impart a circular movement to the fluid in the circulation channel.

23 Claims, 4 Drawing Sheets

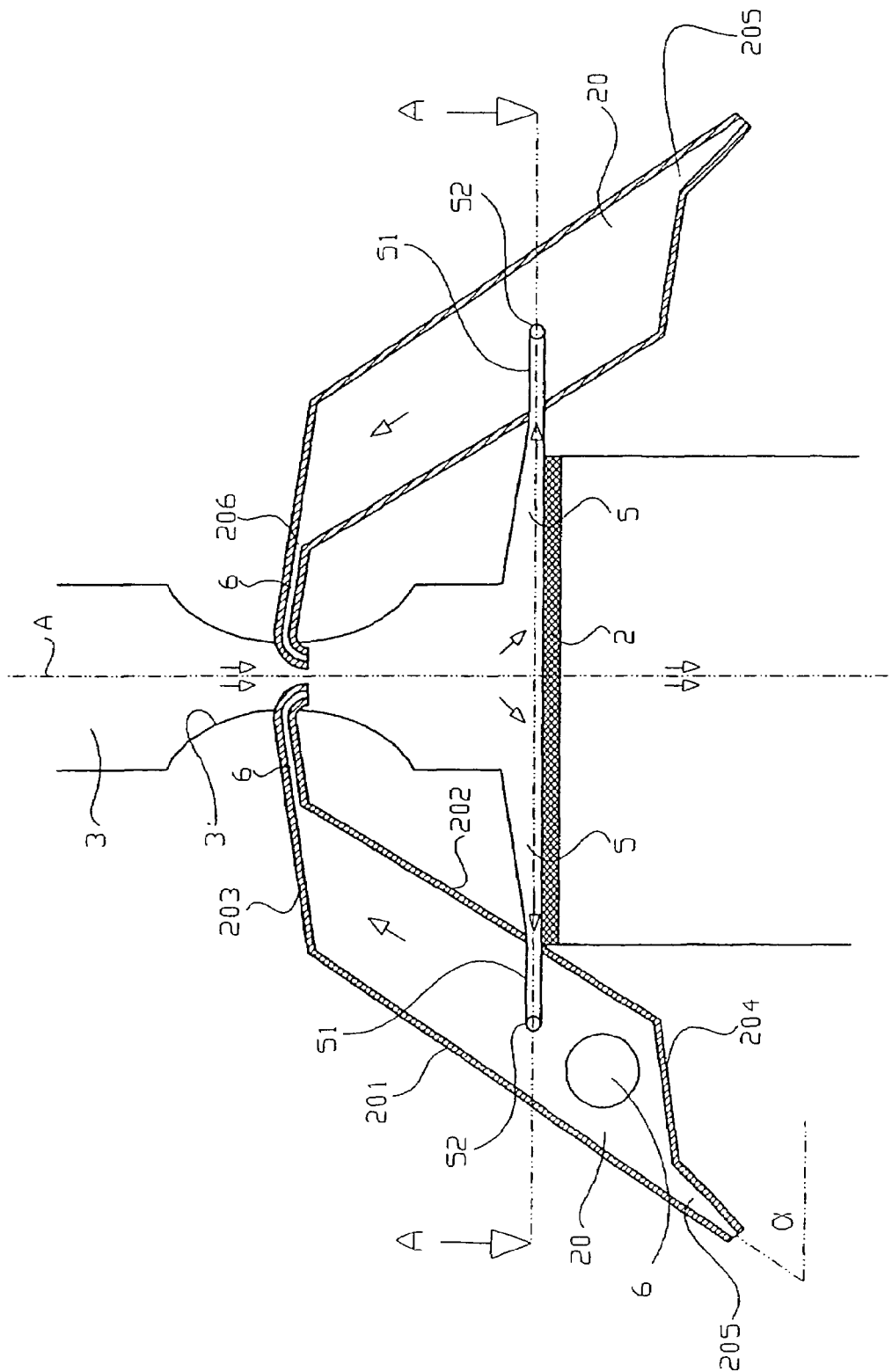

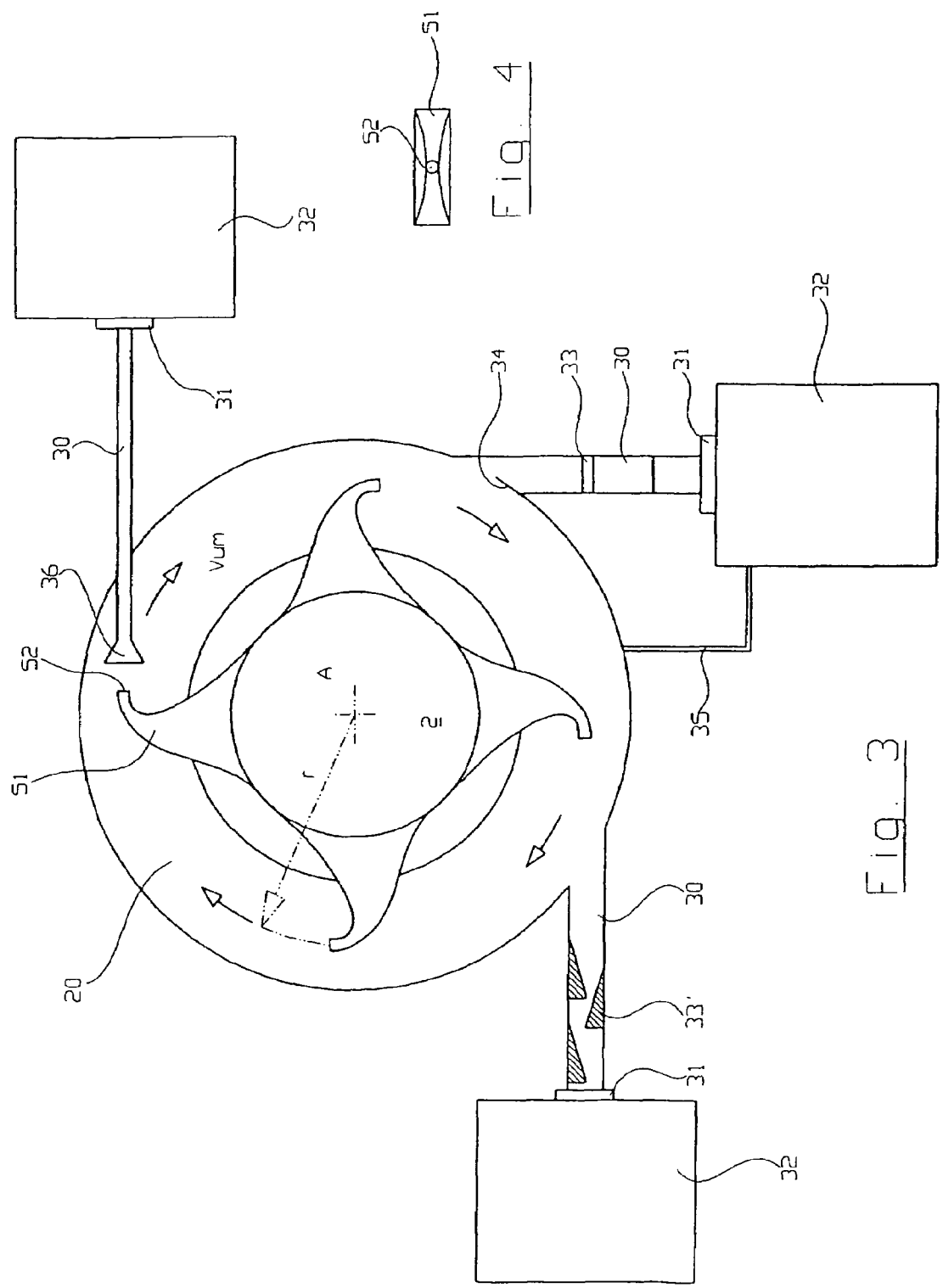

FILTER DEVICE COMPRISING INTEGRAL CENTRIFUGAL SEPARATION

FIELD OF THE INVENTION

The invention refers to a filter apparatus for the filtration of fluids.

BACKGROUND OF THE INVENTION

German Patent DE 72 25 662 U1 discloses an apparatus which has a filter membrane and a main body located upstream from the filter membrane, which body has a supply channel running perpendicular to the surface of the filter membrane and a gap running between it and the filter membrane for the formation of a tangentially directed transverse flow and a return channel. There, a tangential or transverse flow filtration is essentially carried out.

The problem thereby arises of removing undesired components from a liquid with an accumulation of such undesired components, such as particles, microorganisms, chemical substances, such as oils and the like. In this respect, the use of separators, using centrifugal force, or a simple sedimentation, are generally known. Centrifuges have an expensive structure, make high demands on the material and the manufacturing precision because of the required high centrifugal accelerations and are therefore expensive, susceptible to disturbances, and maintenance-intensive.

For a high degree of separation, the sedimentation requires large volumes, on the one hand, and a relatively large time period, on the other hand.

U.S. Pat. No. 5,183,569 A1 also shows a filter apparatus with a filter membrane, in which the loaded fluid is circulated in a closed cycle.

In order to attain a high throughput, for example, centrifuges in parallel operation or so-called separators are used. The separators consist of large thick containers, in which numerous thin plates are above one another, parallel, at a distance to each other and at an angle with respect to the symmetrical axis of the container. These plates are rotated at a high rpm (up to 6000 rpm). The interior is filled via an inlet and with the rapid rotation of the plates and the resulting segregation, fluid components of different densities are separated so that the heavier components along the inclined plates are deflected downwards and the light components, upwards, where they are respectively conducted away.

The problem of the invention under consideration is to improve the filter apparatus of the type mentioned in the beginning to the effect that a very extensive, continuous removal of the fluid components to be separated or to be disposed of is possible, wherein the filter apparatus, to a large extent, works free of maintenance and is of simple construction. Furthermore, if at all possible, no movable components should be required.

SUMMARY OF THE INVENTION

This problem is solved by the features indicated in Claim 1. Advantageous developments and refinements of the invention can be deduced from the subordinate claims.

The basic idea of the invention consists in providing a circulation channel around the circumferential border of the filter membrane, in which channel the separation of fluid components of different densities takes place, using centrifugal acceleration. Means are provided, which impart a circular movement around the middle axis to the fluid in the circulation channel. The inlet of the circulation channel is connected to the discharge from the filter membrane and the outlet for depleted fluid, to the return channel. Furthermore, the circulation channel has an opening for loaded fluid.

Preferably, the circulation channel has a trapezoid cross section and tapers toward the main flow direction directed against the filter membrane. As a cross section, however, an ellipse, a circle, a rectangle, or an annular cone can also be taken into consideration. Also, the circulation channel can be shaped in the form of a coil, wherein the path to be traversed by the fluid is enlarged.

As a means for imparting a circular movement to the liquid in the circulation channel, one can take nozzles into consideration, whose outlet opening is oriented in a tangential direction. For the introduction and/or support of the circular movement, traditional pumps, simple screw propellers, or the like can be used. When using nozzles, the circular movement, once it is started, is essentially not maintained by rotating or other movable elements. Also the return can be carried out without pumps or other movable elements, in that a flow constriction which produces a reduced pressure and thus a suction effect for the return, is provided in the area of the flow of the return channel into the supply channel.

BRIEF DESCRIPTION OF THE FIGURES

In the following, the invention is explained in more detail with the aid of embodiment examples in connection with the drawing. The figures show the following:

FIG. 2, a cross section similar to FIG. 1 according to a second embodiment example of the invention with a trapezoid cross section of the circulation channel;

FIG. 3, a section along line A-A of FIG. 2;

FIG. 4, a representation of a nozzle for the supply of fluid into the circulation channel;

DETAILED DESCRIPTION OF PREFERRED EMBODIMENTS

This application claims priority from German application 102 17 967.0, filed Apr. 22, 2002, the entire disclosure of which is expressly incorporated herein by reference.

Figure 1:
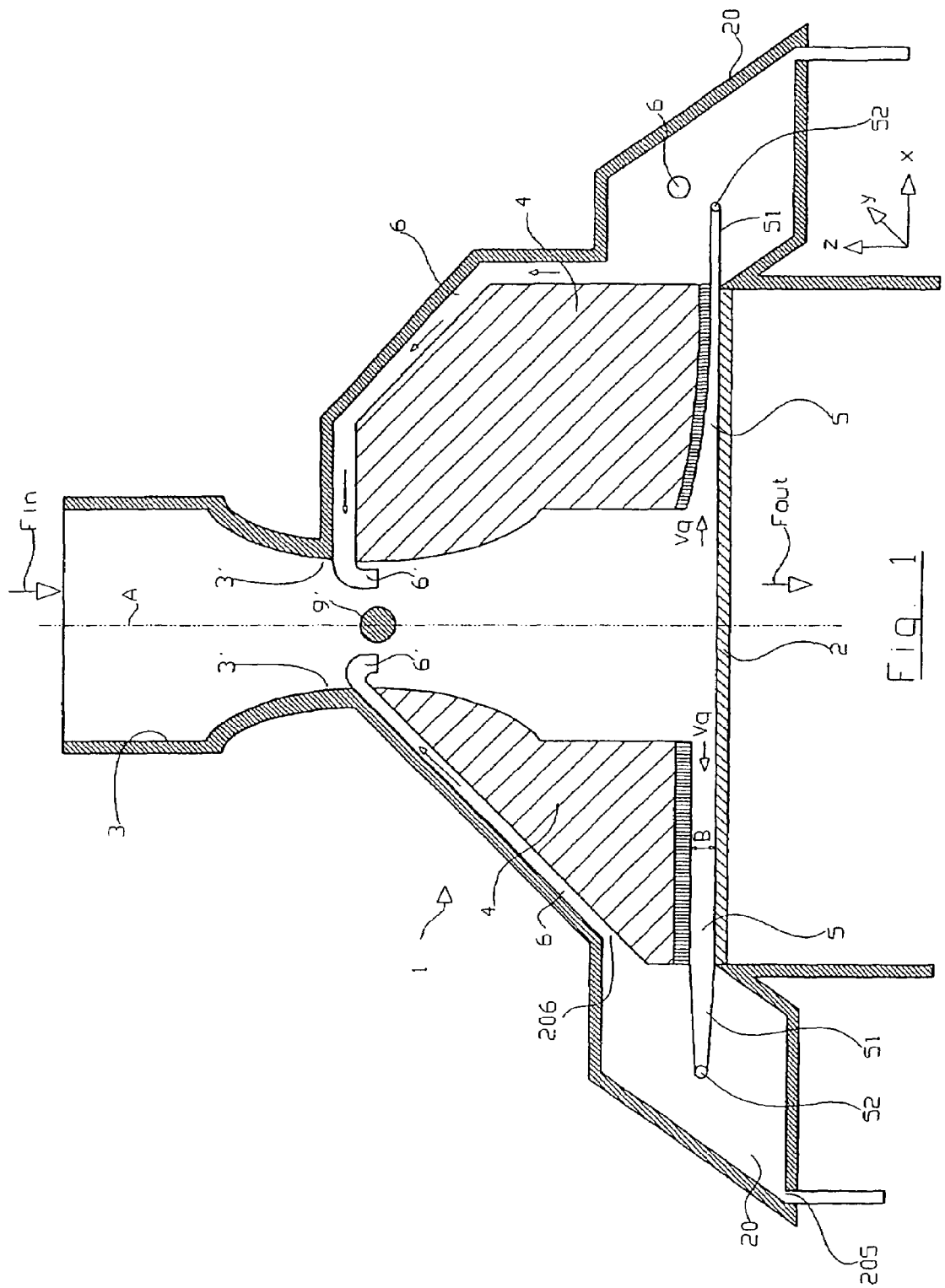
FIG. 1, a cross section of the filter apparatus according to a first embodiment example of the invention.

FIG. 1 shows a filter apparatus 1 with a filter membrane 2, which is supplied with a fluid to be filtered, via a supply channel 3, which is perpendicular to the surface of the filter membrane. The fluid is normally a liquid contaminated with solids. However, it can also be a gas contaminated with solids. A main body 4 is located in the flow direction (see arrow $F_{in}$) before the filter membrane 2; it continues, on the one hand, and thus also forms the supply channel 3, and essentially parallel to the filter membrane 2, has a contour extending laterally beyond the supply channel 3, which contour runs at a small spacing B with respect to the filter membrane and thus forms a gap 5. In the left part of FIG. 1, this gap has constant width B, whereas it is diminished in the right part of FIG. 1 from the middle outwards, wherein a nozzle effect arises.

In the area of the cross section of the supply channel 3, the fluid arrives on the membrane, essentially at a velocity component running perpendicular to the surface of the filter membrane 2. An essential part of the flow is then conducted through the gap 5, which serves as a transverse channel, parallel to the surface of the filter membrane, as is represented by the arrows $v_q$ (for transverse velocity). The transverse channel 5 converts into at least one tube connection 51, whose free end is formed into an exit nozzle 52 and is bent in the tangential direction (see direction y). The tube connection 51 with the exit nozzle 52 empties into a circulation channel 20, which is located around the outer circumference of the membrane 2. During the filtering, the circulation channel 20 is completely filled with fluid, which makes a circular movement around the middle axis A as a result of the described alignment of the exit nozzle 52. A return channel 6 is connected to the upper end of the circulation channel 20 lying opposite the main flow direction $F_{in}$; it conducts the fluid coming from the circulation channel 20 back into the supply channel 3. The circulation channel 20 includes an opening 206 for depleted flow that is connected to return channel 6. The end of the return channel 6, emptying into the supply channel 3, is constructed as tube end 6', which is bent in the direction toward the filter membrane 2, so that the returned fluid arrives parallel to the main flow again into the supply channel. The supply channel 3 has a constriction 3' in the depicted embodiment example, wherein the narrowest point preferably lies in the area of the exit of the tube ends 6' of the return channel. A higher flow velocity occurs through this constriction in this area and thus a pressure reduction, so that the pressure at the exit end of the return channel is smaller than on the surface of the filter membrane 2 or in the circulation channel 20. In addition, the tube ends 6' projecting into the supply channel 3 also bring about a cross section constriction, which supports the described effect.

Alternately or cumulatively to the cross section constriction 3', insertion pieces 9' can also be located in the area of the exit opening 6' of the return channel and have, for example, the form of a spherical body, which also serves as a flow constriction.

Alternately or cumulatively, a pump 6" can also be provided, in accordance with the effect, which brings about the recirculation.

With reference to a cartesian coordinate system, shown in the right, lower corner of FIG. 1, the fluid flows in the direction of the arrow $F_{in}$ in the direction of the negative Z axis, parallel to the symmetrical axis A on the inflow side of the filter membrane. A turbulent flow is thereby created on the inflow side of the filter membrane 2, in particular but not exclusively in its middle; this flow at least slows down, on the inflow side, a deposition of substances retained by the membrane. Furthermore, a flow with a higher transverse flow velocity $v_q$ is produced parallel to the membrane 2 in the gap 5; this flow transports the retained substances along the inflow side of the membrane, parallel to the x direction. The transverse flow in the gap 5 is preferably turbulent, wherein eventually, substances found on the membrane are stirred up by it and are transported off with the transverse flow. The fluid loaded in this manner then arrives at the circulation channel 20 via the tube connections 51 to the exit nozzle 52, where the retained substances are removed as a result of the centrifugal effect or are separated from the fluid, and the transverse flow, essentially freed of the retained substances, is conducted through the return channel 6, on the inflow side, to the main flow, that is, to the supply channel 3. In this way, a cleaning of the membrane and a separation of the retained substance takes place without an interruption of the filtration process.

The cross section of the tube connection 51 declines from the edge of the membrane 2 to the exit nozzle 52, whereby the fluid velocity in the tube connection 51 increases. The ratio of the fluid velocities at the entry into the tube connection and at the nozzle opening is determined by the reciprocal ratio of the individual cross sectional areas. In this way, a high fluid velocity can be attained at the exit nozzle 52.

As can be seen from the known relationship for centrifugal acceleration a:

$$a = v^2/r$$

very high centrifugal accelerations (to >100 g) can be attained with a suitable selection of the parameters (r=radius and v=circulation velocity).

One possibility to increase the velocity v at the exit nozzle 52 consists in constricting the channel in at least one direction (see FIG. 4).

From the continuity equation of fluid dynamics (under the assumption of incompressible or almost incompressible fluids), one can see that the ratio of the velocity ($v_g$) on the inflow side of the membrane 2 and the velocity $V_{um}$ on the outlet of the exit nozzle 52 is essentially equal to the reciprocal ratio of the cross sectional areas perpendicular to the fluid flow. In one numerical example (r=18 cm; H=0.5 cm; c=25.0 cm; nozzle diameter D=0.5 mm), the result is as follows:

$$V_{um}/V_g = 12.5/0.2 = 60$$

If $v_q$, for example, is only 1 m/s, then a nozzle exit velocity $V_{um}$ of ca. 60 m/s would result. By a corresponding adjustment of the parameters, a sufficient velocity component can thus be imparted in the tangential direction, so that a "circulation" is sufficient for a sufficient separation of the fluid components.

In the steady-state operating state of the filter apparatus, the circular movement in the circulation channel and the return of the depleted fluids through the return channel 6 can be maintained alone by the main flow $F_{in}$ and the flow constriction 3', if the main flow, which is normally driven by a pump, has a certain minimum velocity. For starting the filter apparatus and the buildup of the circular movement in the circulation channel 20, additional means 6" are also provided, which impart a circular movement to the fluid in the circulation channel. This can be a pump, a screw propeller, or another known component setting a fluid in motion, which can remain in operation even after starting the filter apparatus.

The separation of the fluid components in the circulation channel 20 takes place primarily as a result of the centrifugal effect. For the circulation channel, there are several possible conformations, which will be described further below. In the embodiment example of FIG. 1, the circulation channel has the described trapezoid cross section.

In the embodiment example of FIG. 2, the circulation channel also has an essentially trapezoid cross section, which is formed by conically shaped disks 201 and 202, lying parallel to one another, which are inclined by an angle α with respect to the membrane 2 and which run rotation-symmetrically around the middle axis A. On the upper and lower ends, the disks 201 and 202 are connected to one another, in a sealed manner, by other disks 203, 204, so that a closed space is formed, which corresponds to the circulation channel 20. On the upper end, where the disks 202 and 203 are connected to one another, one or more tube connections which take over the function of the return channel 6 are located. Instead of tube connections, annular plates can also be used, so that a circulating slit is produced for the return. On the lower end, the two disks 201 and 202 are connected to one another by a corresponding disk 204, wherein one or more outlet connections 205 are provided on the connection site between the disks 201 and 204, at which the greatly loaded fluid can be removed. A cutoff valve (not depicted) can be placed on these connections.

If the fluid in the circulation channel 20 moves at the velocity $V_{um}$ in a circular movement around the axis A, the heavier fluid component is conveyed to disk 201 because of centrifugal acceleration and there migrates downwards in the direction of disk 204 and to the outlet connection 205 because of the inclination α. The circulation channel 20 includes an opening 206 for depleted flow that is connected to return channel 6. The lighter component migrates upwards in the direction of disk 203 because of the inclination α and arrives there at the membrane 2 via the return channel 6 and again via the supply channel 3. The heavier component is caught and disposed of at the connection 205 into collecting containers.

The top view of FIG. 3 shows the circulation channel 20 and the constricting tube connections 51 with the outlet nozzles 52, which are tangentially bent, so as to bring about the circular flow at velocity $V_{um}$. Here, four exit nozzles 52 are provided in a uniform distribution around the circumference.

FIG. 3 also shows that the loading or concentration of the substances to be removed can take place in special areas, containers, or zones. In this respect, the flow is conducted in the circulation channel 20 so that dead zone are produced, which are separated, emptied, and subsequently connected again with the circulation channel during the continuous filtration of the circulation channel 20. One form of this dead zones consists in a tube 30, which goes off tangentially from the circulation channel 20 and which has a smaller diameter than the annular channel and which is connected to a collecting container 32, which corresponds to the aforementioned dead zone, via a detachable flange 31. Flow hindrances 33 can be incorporated in the tube 30; they hinder a return flow from the collecting container 32 to the circulation channel 20. As a flow hindrance, for example, an obstacle 33' with ramp-like projections can be used or also a coarse-mesh metal grating or screen. A border 34 can also be shaped, which separates the flow in the circulation channel, on the transition between the circulation channel 20 and the tube 30.

For reasons of pressure distribution in the entire tube system, pressure compensation connections 35 back to the circulation channel 20 can be provided on the individual collecting container 32, which have a diameter which is small in comparison to the tube 30. Of course, these conduits 35 from the collection container 32 can also be separated by corresponding couplings and/or cutoff valves.

In another embodiment, the feed line to the individual collective containers is designed in the shape of a nozzle 36, whose inlet/cross sectional area is perpendicular to the inflow. The exit nozzles 52, from which the fluid exits from the membrane, can be correlated with these nozzles 36, wherein with this embodiment also, flow hindrances can be present in the tube 30 to make difficult a return flow.

The objective of all these measures is to accumulate the retained substances (with the fluid) supplied by the membrane 2, at a higher rate in the collecting container 32 than are allowed to arrive in the fluid flowing into the membrane, again, via the return channel 6. In a steady-state operation, an equilibrium is set up in the sense that of the substances retained by the membrane and removed per unit volume fluid, clearly fewer arrive via the return channel 6 and thus once more at the membrane.

FIG. 4 also shows a cross section of the exit nozzles 52, which tapers from the membrane toward the outside, to increase the flow velocity.

Figure 5:
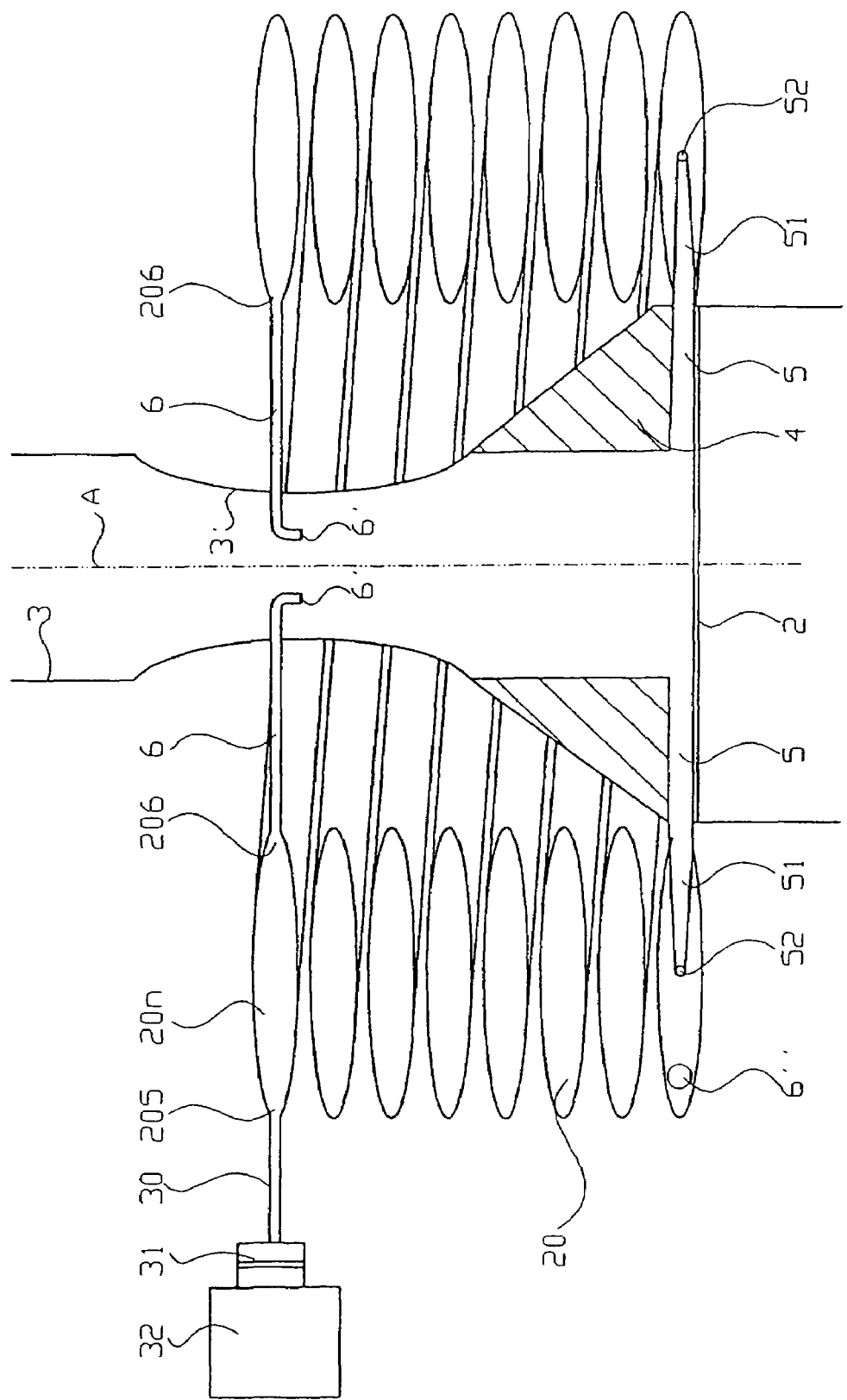
FIG. 5, a cross section of a filter apparatus with a coil-shaped circulation channel.

In accordance with the embodiment example of FIG. 5, the circulation channel can also be conducted in the form of a coil, spiralling around the filter membrane 2, so as to increase, in this manner, the separation rate. Generally, one can say that with the number of drainage conduits from the circulation channel 20 to the collecting container 32 and/or the number of coil stages, the separation ratio velocity increases, that is, the substances to be removed are removed with an increasing efficiency.

In the coil-shaped circulation channel 20 of FIG. 5, the connection for the discharge of the substances to be removed is, radially, outside on the uppermost coil 20n, wherein here too, a collecting container 32 is connected via a coupling with a cutoff valve 31. The circulation channel 20 includes an opening 206 for depleted flow that is connected to return channel 6. The return channel 6 is also placed on the uppermost coil 20n, on the radially inner side, wherein here too, several return canals 6 and several collecting containers 32 can be placed in a distribution around the circulation channel.

In view of the above, it will be seen that the several objects of the invention are achieved and other advantageous results attained.

As various changes could be made in the above methods and products without departing from the scope of the invention, it is intended that all matter contained in the above description and shown in the accompanying drawings shall be interpreted as illustrative and not in a limiting sense.

What is claimed is:

1. A filter apparatus comprising:
   a filter membrane,
   a main body located upstream from the filter membrane, which has a supply channel running perpendicular to the surface of the filter membrane and a gap running between the main body and the filter membrane for the formation of a tangentially directed transverse flow,
   a return channel connected with the supply channel at a flow constriction of the supply channel,
   a circulation channel located around a circumferential edge of the membrane, having an inlet connected to the gap and an outlet connected to the return channel, and
   a circulator to impart a circular movement to the fluid in the circulation channel.

2. The filter apparatus according to claim 1 wherein the circulation channel has a first opening for depleted fluid, a second opening for loaded fluid, a side lying radially inwards with respect to a middle axis of the filter apparatus, and a radially outer side with respect to the middle axis of the filter apparatus.

3. The filter apparatus according to claim 2 wherein the opening for depleted fluid is connected to the return channel.

4. The filter apparatus according to claim 3 wherein the opening for depleted fluid is located on the side of the circulation channel lying radially inwards with respect to the middle axis of the filter apparatus and lies upstream of the membrane in a main flow direction.

5. The filter apparatus according to claim 2 wherein the opening for depleted fluid is located on the side of the circulation channel lying radially inwards with respect to the middle axis of the filter apparatus and lies upstream of the membrane in a main flow direction.

6. The filter apparatus according to claim 2 wherein the opening for loaded fluid is connected to the radially outer side of the circulation channel.

7. The filter apparatus according to claim 1 wherein the circulation channel has a trapezoid cross section and tapers toward a main flow direction directed against the filter membrane.

8. The filter apparatus according to claim 1 wherein the circulation channel has the cross section of an ellipse, a circle, a rectangle, or an annular cone.

9. The filter apparatus according to claim 1 wherein the circulator is at least one nozzle that includes an exit opening and an end that is bent in a direction that is perpendicular to a plane formed by the exit opening.

10. The filter apparatus according to claim 1 wherein the circulator is a pump.

11. The filter apparatus according to claim 1 wherein a collecting container is connected to the circulation channel.

12. The filter apparatus according to claim 11 wherein a flow hindrance is located in a feed line to the collecting container.

13. The filter apparatus according to claim 11 wherein the collecting container is connected to the circulation channel by a detachable coupling.

14. The filter apparatus according to claim 13 wherein a flow hindrance is located in a feed line to the collecting container.

15. A filter apparatus comprising:
a filter membrane,
a main body located upstream from the filter membrane, which has a supply channel running perpendicular to the surface of the filter membrane and a gap running between the main body and the filter membrane for the formation of a tangentially directed transverse flow,
a return channel connected with the supply channel,
a circulation channel located around a circumferential edge of the membrane, having an inlet connected to the gap and an outlet connected to the return channel, wherein the circulation channel is shaped in the form of a coil and extends, with several windings, around the supply channel, and
a circulator to impart a circular movement to the fluid in the circulation channel.

16. A filter apparatus comprising:
a filter membrane,
a main body located upstream from the filter membrane, which has a supply channel running perpendicular to the surface of the filter membrane and a gap running between the main body and the filter membrane for the formation of a tangentially directed transverse flow,
a return channel connected with the supply channel at a flow constriction of the supply channel,
a circulation channel located around a circumferential edge of the membrane, having an inlet connected to the gap and an outlet connected to the return channel, and
a circulation means to impart a circular movement to the fluid in the circulation channel.

17. The filter apparatus according to claim 16 wherein the circulation channel has a first opening for depleted fluid, a second opening for loaded fluid, a side lying radially inwards with respect to a middle axis of the filter apparatus, and a radially outer side with respect to the middle axis of the filter apparatus.

18. The filter apparatus according to claim 17 wherein the opening for depleted fluid is connected to the return channel.

19. The filter apparatus according to claim 18 wherein the opening for depleted fluid is located on the side of the circulation channel lying radially inwards with respect to the middle axis of the filter apparatus and lies upstream of the membrane in a main flow direction.

20. The filter apparatus according to claim 17 wherein the opening for depleted fluid is located on the side of the circulation channel lying radially inwards with respect to the middle axis of the filter apparatus and lies upstream of the membrane in a main flow direction.

21. The filter apparatus according to claim 17 wherein the opening for loaded fluid is connected to the radially outer side of the circulation channel.

22. The filter apparatus according to claim 16 wherein the circulation means is at least one nozzle that includes an exit opening and an end that is bent in a direction that is perpendicular to a plane formed by the exit opening.

23. The filter apparatus according to claim 16 wherein the circulation means is a pump.

* * * * *